US009451685B2

(12) United States Patent
Hong et al.

(10) Patent No.: US 9,451,685 B2
(45) Date of Patent: Sep. 20, 2016

(54) ELECTROMAGNETIC WAVE HIGH FREQUENCY HYBRID PLASMA TORCH

(71) Applicant: KOREA BASIC SCIENCE INSTITUTE, Daejeon (KR)

(72) Inventors: Yong-Cheol Hong, Daejeon (KR); Jung-Sik Yoon, Daejeon (KR); Ji-Hun Kim, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 0 days.

(21) Appl. No.: 14/758,093

(22) PCT Filed: Dec. 27, 2013

(86) PCT No.: PCT/KR2013/012252
§ 371 (c)(1),
(2) Date: Jun. 26, 2015

(87) PCT Pub. No.: WO2014/104780
PCT Pub. Date: Jul. 3, 2014

(65) Prior Publication Data

US 2015/0334815 A1 Nov. 19, 2015

(30) Foreign Application Priority Data

Dec. 27, 2012 (KR) ........................ 10-2012-0154137

(51) Int. Cl.
*B23K 10/00* (2006.01)
*H05H 1/28* (2006.01)
(Continued)

(52) U.S. Cl.
CPC ................. *H05H 1/28* (2013.01); *H05H 1/30* (2013.01); *H05H 1/3405* (2013.01); *H05H 2001/4622* (2013.01)

(58) Field of Classification Search
CPC ............ H05H 1/30; H05H 1/26; H05H 1/34; H05H 1/28; H05H 2001/4622; H05H 1/3405
USPC ............ 219/121.43, 121.52, 121.49, 121.48, 219/121.51; 315/111.51; 156/345.36, 156/345.38
See application file for complete search history.

(56) References Cited

U.S. PATENT DOCUMENTS 4,924,061 A * 5/1990 Labat ....................... H05H 1/46 219/121.48
5,427,827 A * 6/1995 Shing ...................... C23C 16/26 423/446

(Continued)

*Primary Examiner* — Mark Paschall
(74) *Attorney, Agent, or Firm* — Norton Rose Fulbright US LLP

(57) ABSTRACT

The purpose of the present invention is to solve the problems of conventional high frequency plasma torches and develop a plasma torch which enables quick quenching of high frequency plasma and which overcomes instability resulting from the quick quenching. To accomplish the abovementioned objective, according to one embodiment of the present invention, disclosed is an electromagnetic wave high frequency hybrid plasma torch. The electromagnetic wave high frequency hybrid plasma torch may comprise: an electromagnetic wave oscillator for oscillating electromagnetic waves; a power supply unit for supplying power to the electromagnetic wave oscillator; an electromagnetic wave transmission line for transmitting the electromagnetic waves generated by the electromagnetic wave oscillator; a first plasma-forming gas supply unit for injecting a plasma-forming gas; an electromagnetic wave discharge pipe for generating plasma by the electromagnetic waves introduced from the electromagnetic wave transmission line and the plasma-forming gas injected by the first plasma-forming gas supply unit; a high frequency discharge pipe for introducing an electromagnetic wave plasma flow from the electromagnetic wave discharge pipe; an induction coil structure which is coaxial with the high frequency discharge pipe and which has an interior with an induction coil inserted therein; a cooling water channel for introducing cooling water around the high frequency discharge pipe and discharging the cooling water; and a second plasma-forming gas supply unit for introducing a plasma-forming gas into the high frequency discharge pipe.

1 Claim, 2 Drawing Sheets

(51) Int. Cl.

| | |
|---|---|
| ***H05H 1/34*** | (2006.01) |
| ***H05H 1/30*** | (2006.01) |
| *H05H 1/46* | (2006.01) |

(56) References Cited

U.S. PATENT DOCUMENTS

| | | | | |
|---|---|---|---|---|
| 5,453,305 | A * | 9/1995 | Lee | B01J 19/126 118/723 MA |
| 5,743,961 | A * | 4/1998 | Wright | C23C 16/513 118/620 |
| 6,372,156 | B1 * | 4/2002 | Kong | B01J 12/002 252/373 |
| 6,435,131 | B1 * | 8/2002 | Koizumi | C23C 16/511 118/723 IR |
| 8,932,430 | B2 * | 1/2015 | Srivastava | C23C 16/4412 118/723 I |
| 2006/0285108 | A1 * | 12/2006 | Morrisroe | F23C 99/003 356/316 |
| 2010/0055807 | A1 * | 3/2010 | Srivastava | G03F 7/427 438/9 |
| 2011/0298376 | A1 * | 12/2011 | Kanegae | B01J 19/088 315/111.51 |

* cited by examiner

ELECTROMAGNETIC WAVE HIGH FREQUENCY HYBRID PLASMA TORCH

CROSS-REFERENCE TO RELATED APPLICATIONS

This application is a national phase application under 35 U.S.C. §371 of International Patent Application No. PCT/KR2013/012252 filed Dec. 27, 2013, which claims priority to and the benefit of Korean Patent Application No. 10-2012-0154137, filed on Dec. 27, 2012. The entire contents of the referenced applications are incorporated herein by reference.

TECHNICAL FIELD

The present invention relates to an electromagnetic wave/high frequency hybrid plasma torch, and more particularly, to a hybrid plasma torch capable of introducing plasma generated by electromagnetic waves into a high-frequency plasma torch.

BACKGROUND ART

Synthetic methods and apparatuses using plasma torches using electromagnetic waves and a high frequency have been developed and introduced.

Prior-art Patent Document 1 (Korean Registered Patent No. 10-0631828) discloses an integral inductively coupled plasma torch having a cylindrical induction coil structure.

Prior-art Patent Document 1 discloses a configuration in which double ring-shaped channels (23 and 24) are obtained between a torch outer wall and an induction coil structure and between the induction coil structure and a plasma confinement tube by forming an induction coil portion of the high-frequency plasma torch to have a cylindrical induction coil structure and coaxially disposing the cylindrical induction coil structure between the outer wall and the plasma confinement tube, and main components of the torch are isolated into the torch outer wall, the induction coil structure, and the plasma confinement tube by integrating the induction coil structure and the torch outer wall through a high-frequency input terminal to optionally select and use optimum materials and processing methods for the respective components of the torch, thereby improving the performance and economic feasibility of the torch.

According to such a conventional high-frequency plasma torch, the high-frequency plasma torch may be used to melt or evaporate a solid powder or a spray liquid injection by heating the solid powder or the spray liquid injection using high-temperature (8,000 to 10,000 K) thermal plasma formed in a wide and large volume in the torch, or used to increase thermal cracking or enthalpy by heating a gas. Since such tasks are generally performed in a confinement tube made of a refractory material capable of withstanding a temperature of 2,000 K or more, or performed outside of an outlet of the confinement tube to ignite plasma sparks in the form of a jet, the high-frequency plasma torch has been used in various fields such as spray coating of high melting point materials, ultrafine powder synthesis, chemical vapor deposition, waste incineration, and thermal cracking, and its applicability has increased in various fields for the development of new technology.

High-frequency plasma torches having characteristics, such as electrodeless discharging, a large volume, a suitable gas velocity, and the like, seem to be desirably applied to various scientific and industrial fields. However, the absence of electrodes forces the high-frequency plasma torch to be very sensitive to external disturbance factors such as an inflow of a reactant into plasma. In effect, when an amount of the reactant is greater than a predetermined small amount, the inflow of the reactant into the plasma causes fluctuations of the plasma to induce quick quenching of the plasma. The sensitive characteristics of such high-frequency plasma serve as the disturbance factor in expansion to various fields.

Therefore, it is no exaggeration to say that success or failure of an operation of the high-frequency plasma torch in various fields especially depends on whether plasma is stably maintained when the reactant is injected into plasma. For this purpose, when a high-temperature (approximately 5,000 K) and high-density plasma flow is introduced into a high-frequency plasma generation region, quick quenching of high-frequency plasma may be realized, and instability resulting from the quick quenching may be overcome.

Accordingly, the present inventors have conducted research in recognition of such problems, and developed an electromagnetic wave/high frequency hybrid plasma torch capable of realizing quick quenching of high-frequency plasma and overcoming instability resulting from the quick quenching by introducing the following configurations to solve the problems of the conventional high-frequency plasma torch.

PRIOR-ART DOCUMENT

Patent Document

Patent Document 1: KR10-0631828 B1

DISCLOSURE

Technical Problem

The present invention is designed to solve the problems of conventional high-frequency plasma torches, and therefore it is an object of the present invention to provide a plasma torch capable of realizing quick quenching of high-frequency plasma and overcoming instability resulting from the quick quenching.

Technical Solution

To solve the above problems, one aspect of the present invention may disclose an electromagnetic wave/high frequency hybrid plasma torch. The electromagnetic wave/high frequency hybrid plasma torch an electromagnetic wave oscillator configured to oscillate electromagnetic waves, a power supply unit configured to supply power to the electromagnetic wave oscillator, an electromagnetic wave transmission line configured to transmit the electromagnetic waves generated at the electromagnetic wave oscillator, a first plasma-forming gas supply unit configured to inject a plasma-forming gas, an electromagnetic wave discharge pipe in which plasma is generated by the electromagnetic waves introduced from the electromagnetic wave transmission line and the plasma-forming gas injected from the first plasma-forming gas supply unit, a high-frequency discharge pipe through which an electromagnetic wave plasma flow is introduced from the electromagnetic wave discharge pipe, a cylindrical induction coil structure which is coaxial with the high-frequency discharge pipe and has an induction coil inserted therein, an outer wall configured to surround the induction coil structure, a cooling water channel through which cooling water is introduced into the high frequency discharge pipe and discharged from the high frequency discharge pipe, and a second plasma-forming gas supply unit through which a plasma-forming gas is introduced into the high-frequency discharge pipe.

Also, the electromagnetic wave/high frequency hybrid plasma torch may further include a reactive gas supply unit configured to inject a reactive gas into the high-frequency discharge pipe.

In addition, the electromagnetic wave/high frequency hybrid plasma torch may further include a high-frequency input/output copper pipe configured to input/output high frequency into/from the induction coil structure.

Additionally, the plasma-forming gas may be $CO_2$, and the reactive gas may be selected from the group consisting of $CH_4$, $H_2O$, and $O_2$.

Further, the cooling water channel may include a first ring-shaped cooling water channel present between the outer wall and the induction coil structure, and a second ring-shaped cooling water channel present between the induction coil structure and the high-frequency discharge pipe. In this case, the first cooling water channel and the second cooling water channel may be connected and isolated from the outside so that cooling water injected into one lateral portion of the cooling water channel may circulate along the cooling water channel to be discharged from the other lateral portion of the cooling water channel.

Advantageous Effects

According to the configurations of the present invention as described above, when a high-temperature (approximately 5,000 K) and high-density plasma flow is introduced into a high-frequency plasma generation region, quick quenching of high-frequency plasma can be realized, and instability resulting from the quick quenching can be overcome.

BEST MODE

Hereinafter, an electromagnetic wave/high frequency hybrid plasma torch according to one exemplary embodiment of the present invention will be described in detail with reference to the accompanying drawings. The present invention may be modified in various forms and have various embodiments, and thus particular embodiments thereof will be illustrated in the accompanying drawings and described in the detailed description. However, it should be understood that the description set forth herein is not intended to limit the present invention, and encompasses all modifications, equivalents, and substitutions that do not depart from the spirit and scope of the present invention. In description of parts shown in the accompanying drawings, like numbers refer to like elements. In the accompanying drawings, the dimensions of elements may be exaggerated or diminished for the sake of convenience of description.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or combinations thereof, but do not preclude the presence or addition of one or more other features, integers, steps, operations, elements, components and/or combinations thereof.

Unless defined otherwise, all the terms (including technical and scientific terms) used herein have the same meaning as commonly understood by one of ordinary skill in the art to which the present invention belongs. It will be further understood that the terms, such as those defined in commonly used dictionaries, should be interpreted as having meanings that are consistent with their meanings in the context of the relevant art, and will not be interpreted in an idealized or overly formal sense unless expressly defined otherwise herein.

An electromagnetic wave plasma torch generator is disclosed in Korean Patent No. 10-0394994, the patent of which has been registered by this applicant and the entire content of which are incorporated herein by reference.

Figure 1:
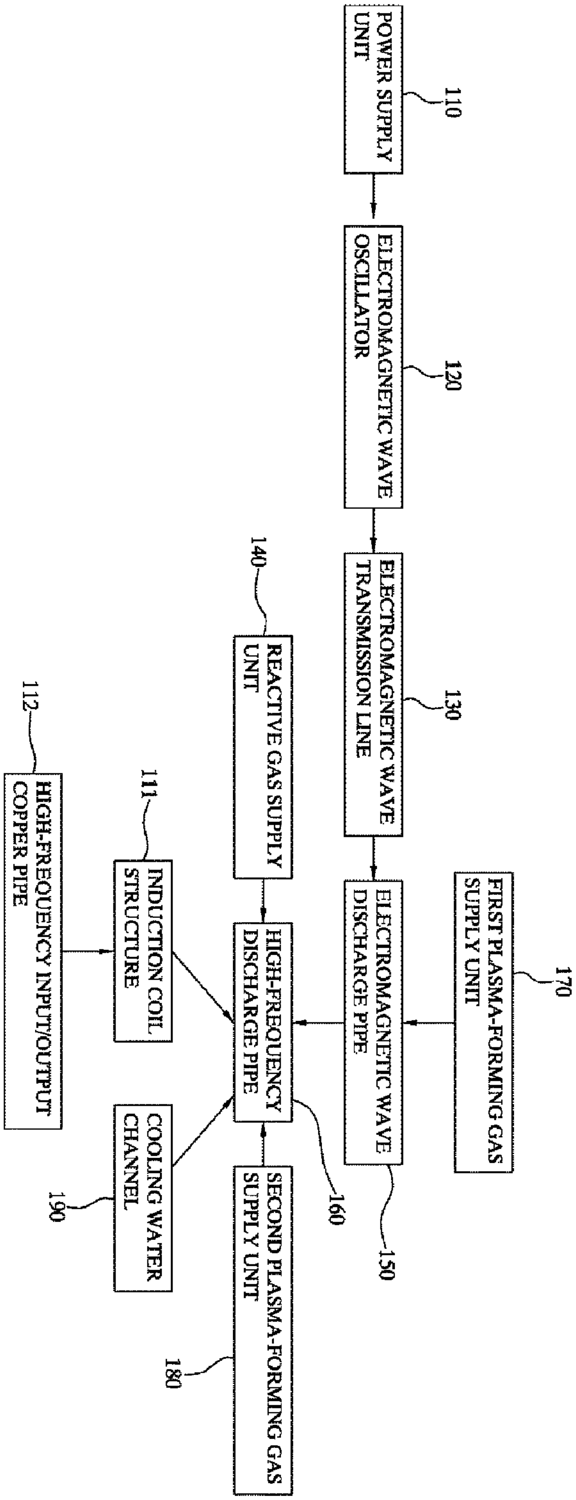
FIG. 1 is a functional block diagram of an electromagnetic wave/high frequency hybrid plasma torch according to an exemplary embodiment of the present invention.

FIG. 1 is a functional block diagram of an electromagnetic wave/high frequency hybrid plasma torch according to an exemplary embodiment of the present invention.

The electromagnetic wave/high frequency hybrid plasma torch 100 may include an electromagnetic wave oscillator 120 for oscillating electromagnetic waves, a power supply unit 110 for supplying power to the electromagnetic wave oscillator, an electromagnetic wave transmission line 130 for transmitting the electromagnetic waves generated at the electromagnetic wave oscillator, a first plasma-forming gas supply unit 170 for injecting a plasma-forming gas, an electromagnetic wave discharge pipe 150 in which plasma is generated by the electromagnetic waves introduced from the electromagnetic wave transmission line 130 and the plasma-forming gas injected from the first plasma-forming gas supply unit, a high-frequency discharge pipe 160 through which an electromagnetic wave plasma flow is introduced from the electromagnetic wave discharge pipe, an induction coil structure 111 which is coaxial with the high-frequency discharge pipe and has an induction coil inserted therein, an outer wall surrounding the induction coil structure, a cooling water channel 190 through which cooling water is introduced toward the high frequency discharge pipe and discharged from the high frequency discharge pipe, and a second plasma-forming gas supply unit 180 through which a plasma-forming gas is introduced into the high-frequency discharge pipe.

Also, the electromagnetic wave/high frequency hybrid plasma torch 100 may further include a reactive gas supply unit 140 for injecting a reactive gas into the high-frequency discharge pipe.

In addition, the electromagnetic wave/high frequency hybrid plasma torch 100 may further include a high-frequency input/output copper pipe 112 for inputting/outputting a high frequency into/from the induction coil structure.

Additionally, the plasma-forming gas may be $CO_2$, and the reactive gas may be selected from the group consisting of $CH_4$, $H_2O$, and $O_2$.

Further, the cooling water channel 190 may include a first ring-shaped cooling water channel present between the outer wall and the induction coil structure, and a second ring-shaped cooling water channel present between the induction coil structure and the high-frequency discharge pipe. In this case, the first cooling water channel and the second cooling water channel may be connected and isolated from the outside so that cooling water injected into one lateral portion of the cooling water channel can circulate along the cooling water channel and be discharged into the other lateral portion of the cooling water channel.

The power supply unit 110 may, for example, be composed of a full-wave voltage multiplier and a pulse and direct current (DC) device to supply power to the electromagnetic wave oscillator 120.

A magnetron for oscillating electromagnetic waves at a bandwidth of 10 MHz to 10 GHz may, for example, be used as the electromagnetic wave oscillator 120.

The electromagnetic wave transmission line 130 is a kind of a wave guide, and is configured to transmit the electromagnetic waves to the electromagnetic wave discharge pipe 150.

The electromagnetic wave discharge pipe 150 is installed through the electromagnetic wave transmission line 130 to provide a space in which plasma is generated by the electromagnetic waves input through the electromagnetic wave transmission line 130. For example, the first plasma-forming gas supply unit 170 supplies a gas for forming plasma, such as carbon dioxide ($CO_2$), to the electromagnetic wave discharge pipe 150.

At the electromagnetic wave discharge pipe 150, plasma is generated by the electromagnetic waves, and the generated plasma is introduced into the high-frequency discharge pipe 160 connected to the electromagnetic wave discharge pipe.

Cooling water introduced through the cooling water channel 190 circulates between the outer wall, the induction coil structure 111 and the high-frequency discharge pipe 160 to cool the outer wall, the induction coil structure 111, and the high-frequency discharge pipe 160.

For example, a reactive gas, such as $CH_4$, $H_2O$ or $O_2$, may be introduced into the high-frequency discharge pipe 160 through the reactive gas supply unit 140.

The induction coil structure 111 may include an induction coil surrounding the high-frequency discharge pipe 160 in a ring shape.

When a high frequency is input into the induction coil through the high-frequency input/output copper pipe 112, a high-frequency current may form plasma in the high-frequency discharge pipe using induction heating caused by an eddy current according to the Faraday's law and Ampere's law.

Figure 2:
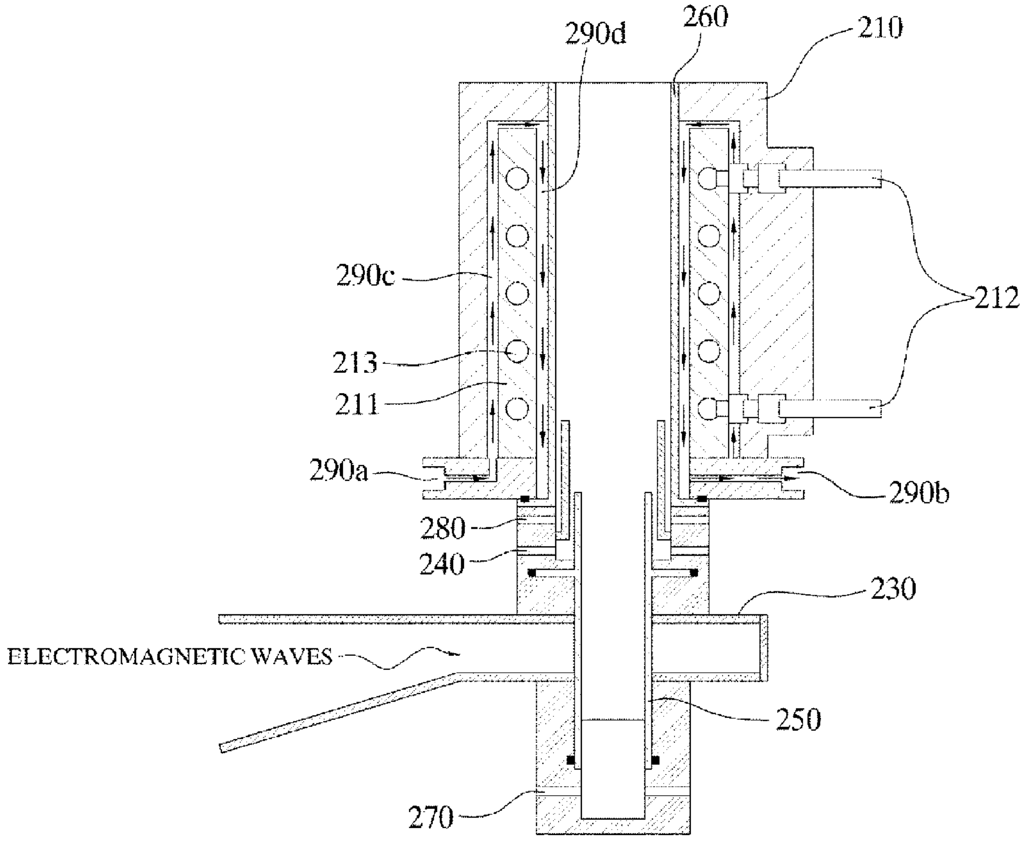
FIG. 2 is a schematic view of the electromagnetic wave/high frequency hybrid plasma torch according to the exemplary embodiment of the present invention.

FIG. 2 is a schematic view of an electromagnetic wave/high frequency hybrid plasma torch 200 according to an exemplary embodiment of the present invention.

When power is supplied from the power supply unit to the electromagnetic wave oscillator, electromagnetic waves may be oscillated by the electromagnetic wave oscillator, and the electromagnetic waves generated at the electromagnetic wave oscillator may be transmitted through an electromagnetic wave transmission line 230. As shown in FIG. 2, the electromagnetic wave transmission line 230 may be a wave guide having a structure in which an inlet through which the electromagnetic waves are introduced is curved at an angle of 0° to 90°.

For example, a plasma-forming gas, such as $CO_2$, may be injected into an electromagnetic wave discharge pipe 250 through the first plasma-forming gas supply unit 270.

As shown in FIG. 2, the electromagnetic wave discharge pipe 250 may be formed in a ring shape through the electromagnetic wave transmission line 230, and plasma may be generated by the electromagnetic waves introduced from the electromagnetic wave discharge pipe 250 into the electromagnetic wave transmission line 230, and the plasma-forming gas injected from the first plasma-forming gas supply unit.

The electromagnetic wave transmission line 230 may have a closed end to reflect the transmitted electromagnetic waves. For example, the strongest electric field may be formed in the electromagnetic wave discharge pipe by passing the electromagnetic wave discharge pipe 250 through the end of the electromagnetic wave transmission line 230 at a ¼ wavelength position.

Since the electromagnetic wave discharge pipe 250 and a high-frequency discharge pipe 260 are connected, the plasma generated at the electromagnetic wave discharge pipe 250 is introduced into the high-frequency discharge pipe 260.

A ring-shaped induction coil structure 211 is formed to be coaxial with the high-frequency discharge pipe 260. An induction coil 213 is inserted into the induction coil structure 211 on an axis perpendicular to the high-frequency discharge pipe 230.

An outer wall 210 surrounds the induction coil structure 211.

Cooling water is introduced into the high-frequency discharge pipe and discharged from the high-frequency discharge pipe through cooling water channels 290*a*, 290*b*, 290*c* and 290*d* so that the cooling water circulates between the outer wall, the induction coil structure 211 and the high-frequency discharge pipe 260 to cool the outer wall, the induction coil structure 211, and the high-frequency discharge pipe 260.

The cooling water channels 290*a*, 290*b*, 290*c* and 290*d* include a first ring-shaped cooling water channel 290*c* present between the outer wall 210 and the induction coil structure 211, and a second ring-shaped cooling water channel 290*d* present between the induction coil structure 211 and the high-frequency discharge pipe 260. In this case, the first cooling water channel 290*c* and the second cooling water channel 290*d* are connected and isolated from the outside so that cooling water injected into one lateral portion 290*a* of the cooling water channel can circulate along the cooling water channel to be discharged from the other lateral portion 290*b* of the cooling water channel.

A high frequency may be input into the induction coil structure 211 through a high-frequency input/output copper pipe 212 so that a high-frequency current can form plasma in the high-frequency discharge pipe using induction heating caused by an eddy current according to the Faraday's law and Ampere's law. For example, a second plasma-forming gas supply unit 280 may supply a gas for forming plasma, such as carbon dioxide ($CO_2$), to the high-frequency discharge pipe 260.

For example, a reactive gas, such as $CH_4$, $H_2O$ or $O_2$, may be introduced into the high-frequency discharge pipe 260 through the reactive gas supply unit 240.

The description of the exemplary embodiments presented herein is provided in order to enable those of ordinary skill in the art to embody and practice the present invention. Various changes and modifications made to these exemplary embodiments will be apparent to those of ordinary skill in the art to which the present invention belongs, and the general principles defined herein will be applied to other exemplary embodiments without departing from the scope of the present invention. Accordingly, the present invention is not limited to the exemplary embodiments presented herein, but should be interpreted in a wide range consistent with the principles and novel characteristics provided herein.

The invention claimed is:

1. An electromagnetic wave/high frequency hybrid plasma torch comprising:

an electromagnetic wave oscillator configured to oscillate electromagnetic waves;

a power supply unit configured to supply power to the electromagnetic wave oscillator;

an electromagnetic wave transmission line configured to transmit the electromagnetic waves generated at the electromagnetic wave oscillator;

a first plasma-forming gas supply unit configured to inject a plasma-forming gas;

an electromagnetic wave discharge pipe in which plasma is generated by the electromagnetic waves introduced from the electromagnetic wave transmission line and the plasma-forming gas injected from the first plasma-forming gas supply unit;

a high-frequency discharge pipe through which an electromagnetic wave plasma flow is introduced from the electromagnetic wave discharge pipe;

a cylindrical induction coil structure which is coaxial with the high-frequency discharge pipe and has an induction coil inserted therein;

an outer wall configured to surround the induction coil structure;

a cooling water channel through which cooling water is introduced into the high frequency discharge pipe and discharged from the high frequency discharge pipe;

a second plasma-forming gas supply unit through which a plasma-forming gas is introduced into the high-frequency discharge pipe; and a reactive gas supply unit configured to inject a reactive gas into the high-frequency discharge pipe, wherein the cooling water channel comprises:

a first ring-shaped cooling water channel present between the outer wall and the induction coil structure; and a second ring-shaped cooling water channel present between the induction coil structure and the high-frequency discharge pipe, wherein the first cooling water channel and the second cooling water channel are connected and isolated from the outside so that cooling water injected into one lateral portion of the cooling water channel circulates along the cooling water channel to be discharged from the other lateral portion of the cooling water channel.

* * * * *